(No Model.)     4 Sheets—Sheet 1.
H. E. MILLER.
METHOD OF AND APPARATUS FOR TREATMENT OF CELLULOID OR OTHER PLASTIC MATERIAL.
No. 534,445. Patented Feb. 19, 1895.
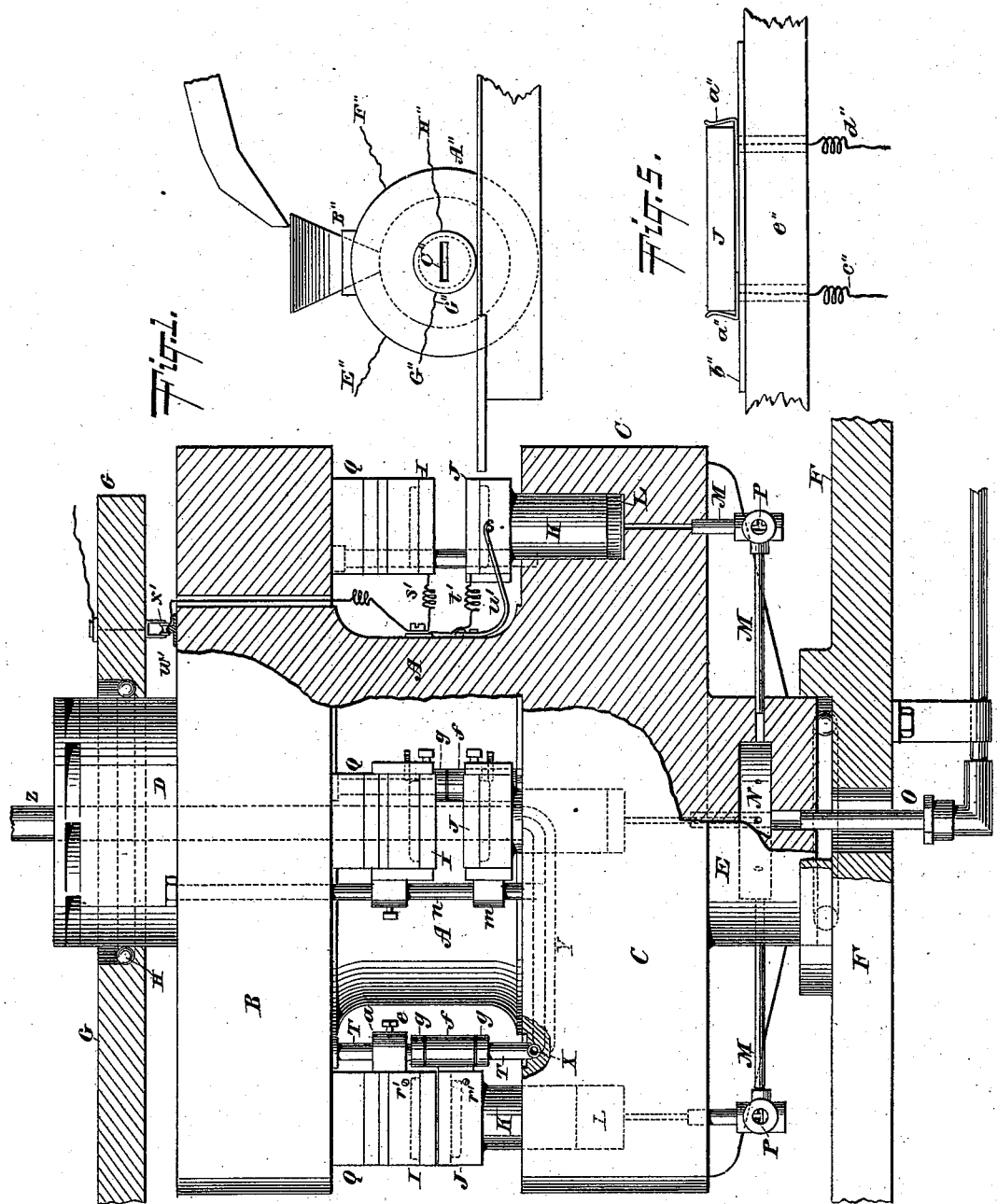
WITNESSES:
Gustave Dieterich
C. Aug. Dieterich
INVENTOR
Horace E. Miller,
BY
Chas. E. Gill
ATTORNEY.

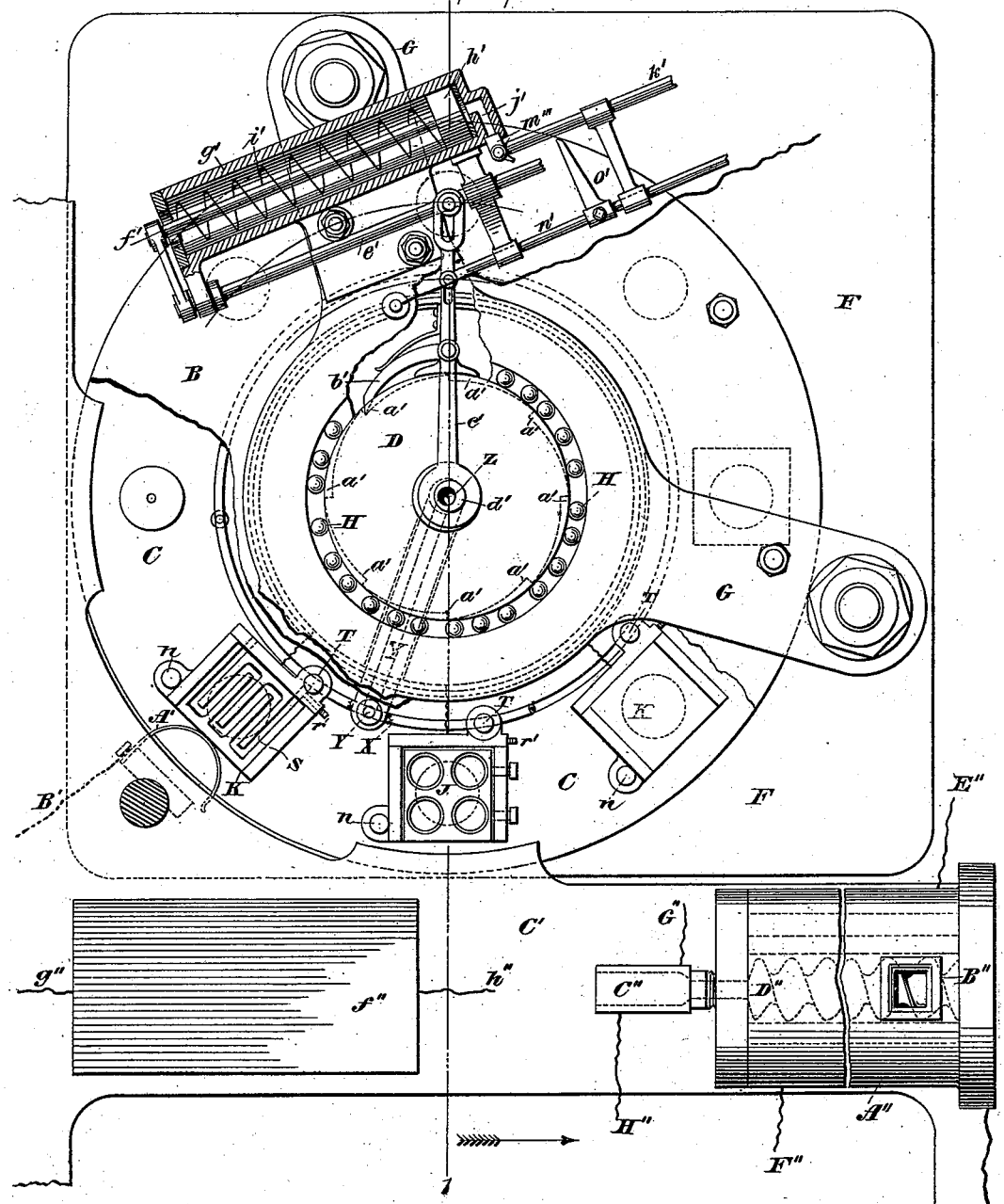

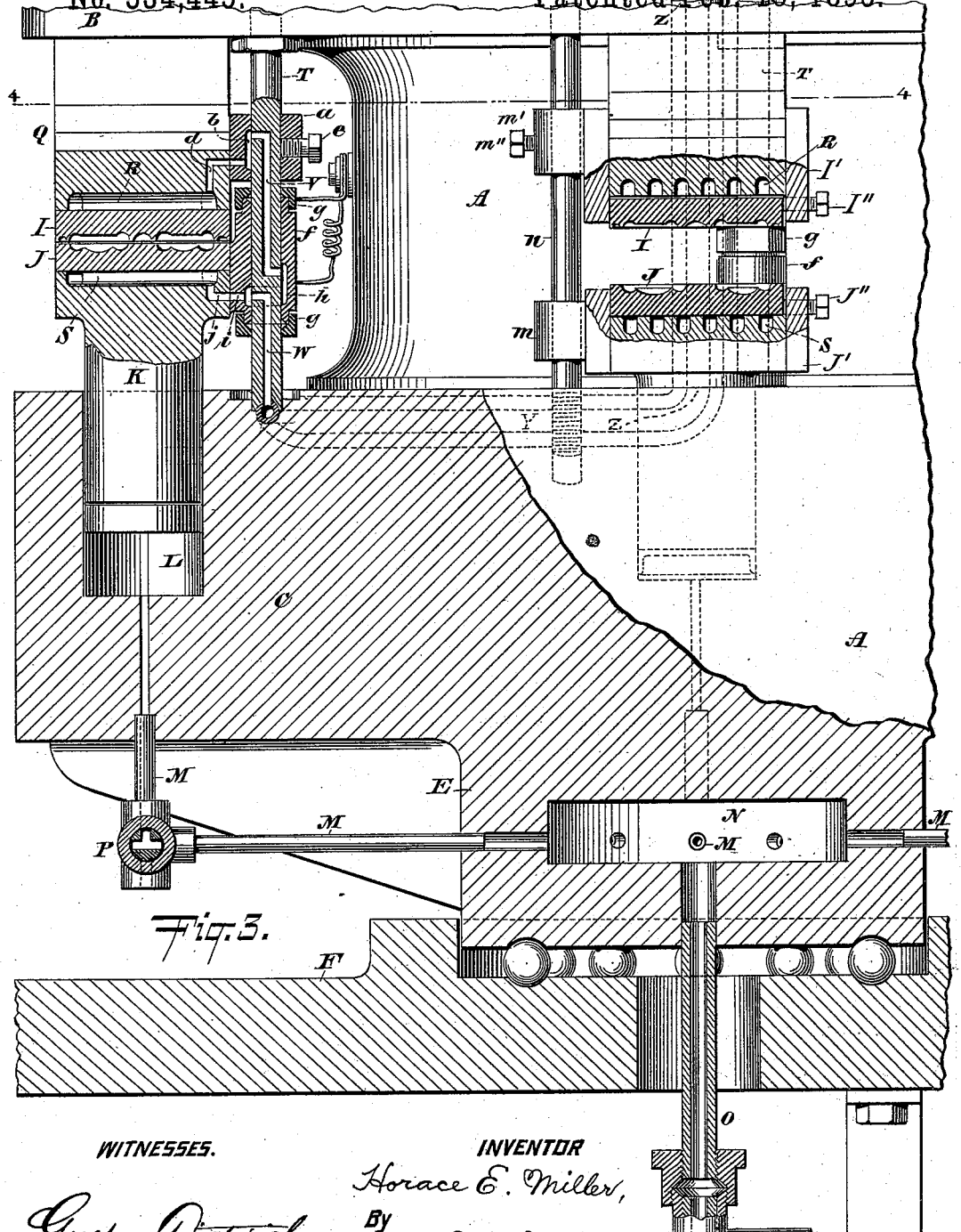

(No Model.) 4 Sheets—Sheet 4.
H. E. MILLER.
METHOD OF AND APPARATUS FOR TREATMENT OF CELLULOID OR OTHER PLASTIC MATERIAL.
No. 534,445. Patented Feb. 19, 1895.
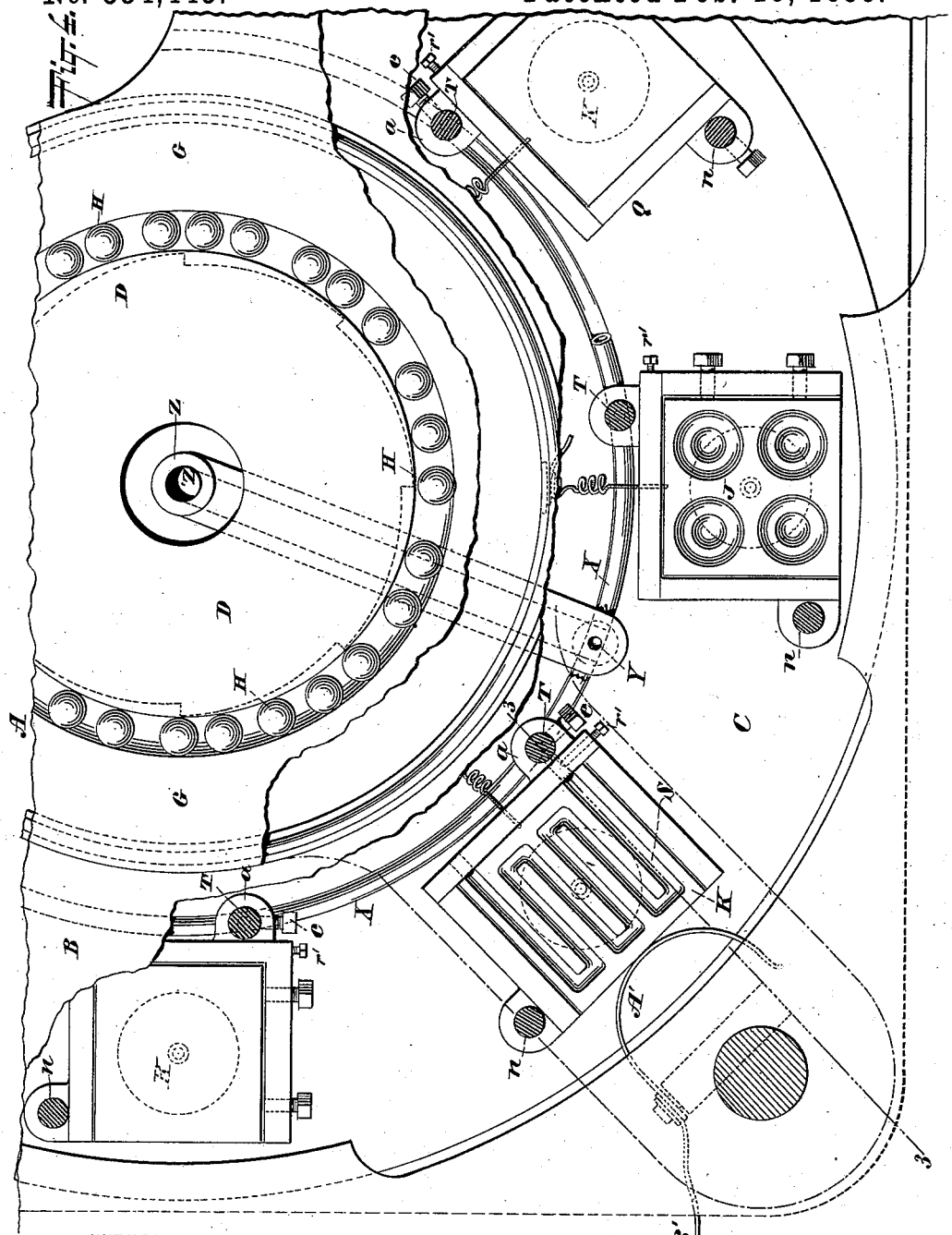
WITNESSES:
Gustave Dieterich
Attug. Dieterich
INVENTOR
Horace E. Miller,
BY
Chas. C. Gill
ATTORNEY.

UNITED STATES PATENT OFFICE.

HORACE E. MILLER, OF NEWARK, NEW JERSEY, ASSIGNOR TO THE CELLULOID COMPANY, OF SAME PLACE.

METHOD OF AND APPARATUS FOR TREATMENT OF CELLULOID OR OTHER PLASTIC MATERIAL.

SPECIFICATION forming part of Letters Patent No. 534,445, dated February 19, 1895.

Application filed October 12, 1891. Serial No. 408,492. (No model.)

*To all whom it may concern:*

Be it known that I, HORACE E. MILLER, a citizen of the United States, and a resident of Newark, in the county of Essex and State of New Jersey, have invented certain new and useful Improvements in the Method of and Apparatus for the Treatment of Celluloid or other Plastic Material, of which the following is a specification.

The invention relates to improvements in methods of and apparatus for the treatment, manufacture and molding of celluloid and other plastic materials; and it consists in the features hereinafter particularly specified and then sought to be specifically defined by the claims.

I will first describe the apparatus illustrated in the accompanying drawings forming a part of this application, and then more fully explain the nature and scope of the invention, with its resultant advantages.

Referring to the accompanying drawings Figure 1 is a side elevation, partly in section on the dotted line 1—1 of Fig. 2, of a machine constructed in accordance with the invention; a portion of Fig. 1 being to the right of the main portion of said figure. Fig. 2 is a top view, partly broken away and partly in section, of same; a portion of Fig. 2 being shown under the main portion of said figure. Fig. 3 is an enlarged vertical section of a portion of said machine, said section being on the dotted line 3—3 of Fig. 4. Fig. 4 is an enlarged top view of same, partly broken away and partly in section on the dotted line 4—4 of Fig. 3, and Fig. 5 is a detached side view of a receiver in which the dies preparatory to being introduced into the machine proper may be heated by an electric current, thereby to prepare them for molding the plastic material into the desired form.

In the drawings A designates a rotating frame provided with the upper and lower facing portions or flanges B. C. carrying the dies in which the plastic material is given form under the application of heat and pressure. The frame A is provided at its upper and lower ends with the hubs D. E. the latter resting on ball-bearings seated in the base plate F. and the former entering the receiving aperture formed in the top-frame G. which is bolted to the base plate F and retains the casting A in position during its intermittent revolution. The top-frame G. is also provided with ball-bearings H for the hub D.

The mechanism by which the casting or frame A has imparted to it an intermittent revolution is illustrated in Fig. 2 and will be hereinafter described.

In the construction of the frame A, I prefer, for the sake of convenience, to cast the flange C and hub E in one piece and the remaining portions in another piece, and then, after forming in the flange C the hydraulic cylinders and seat for the refrigerant tubes hereinafter described, to unite said pieces by means of suitable bolts, but if desired the entire frame A may constitute a single casting.

The upper and lower sections of the dies are lettered I, J, respectively, the former being suspended from the lower face of the upper flange B, and the latter (the lower section J) being mounted upon the upper ends of the pistons K, which enter cylinders L formed in the upper face of the lower flange C, as more clearly shown in Fig. 3.

The cylinders L are each independently connected by piping M with the interior chamber N formed in the hub E, and this chamber by means of piping O is connected with a source of water supply under pressure, the purpose being to cause the upward movement of the pistons K and die sections J by hydraulic pressure. Each line of piping M is provided with an appropriate valve P by which the pressure may be admitted to or shut off from the cylinders L.

The sections I of the dies are secured to the blocks Q, which extend downward from the flange B, and the lower one of these blocks is provided with the serpentine passages R, through which at the proper time a refrigerant is circulated, as hereinafter explained; and the upper ends of the pistons K upon which the lower sections J of the dies are secured, are likewise provided with the serpentine passages S to permit the circulation of said refrigerant.

The lower block Q for the upper die sections I and the upper end of the pistons K for the lower die sections are respectively provided with the three-sided box frames I', J', as shown more clearly in Fig. 3, to receive said die sections, which are detachably held in place by means of set screws I'', J''.

In rear of each pair of dies I, J, there extends from the flange B to the flange C, the rigid rod T (see Fig. 3) which is provided with the independent interior passages V, W, both of which are open at each end, and the lower of which at its open lower end connects with the pipe X, which is embedded in the upper surface of the flange C and communicates, through the radial pipe Y, with the pipe Z extending downward centrally into the frame A and being in connection with a suitable refrigerant. There is thus established a communication from the vertical supply pipe Z through the radial pipe Y, and circular pipe X, to each of the passages V, W in the rods T.

Upon the upper portion of each of the rods T is adjusted the block $a$ having the interior passage $b$, communicating at one end with the upper end of the above-mentioned passage V, and at the other end with the port $d$ leading to the serpentine passages R for the upper die section I. The block $a$ is held in position on the rod T by means of a set screw $e$ and is stationary during the operation of the machine, its passage $b$ being constantly in alignment with the passage V and port $d$.

Upon the lower portion of each of the rods T is the tubular sleeve $f$ having a gland $g$ at each end and adapted to move vertically on said rod simultaneously with the vertical reciprocation of the lower die section J and frame J' to which at one side it is secured or formed integral therewith. The sleeve $f$ is provided with the interior annular chamber $h$ and with the passage $i$ leading from said chamber to the port $j$ of the piston K, which part is in constant communication with the serpentine passages S for the lower die sections J. When the sleeve $f$ is in its upward position on the rod T, the annular chamber $h$ therein will be in communication with the upper end of the passage W, and lower end of the passage V, and the passage $i$ will be in communication with the port $j$, and thus it will be seen that the refrigerant from the pipes Z, Y, X, will, when the sleeve $f$ is in its upward position, pass into the passage W and chamber $h$, and thence through the passage $i$ and port $j$ into the serpentine passages S, and also from said chamber $h$ into the passage V and passage $b$, whence it will be directed through port $d$ into the sepentine passages R for the upper die sections I. When however the sleeve $f$ and die J are in their lower position the communication of the refrigerant with the serpentine passages R, S, is entirely cut off, since under said condition the annular chamber $h$ will fall below the adjoining ends of the passages V, W, and said ends of the said passages will be closed by solid portions of the sleeve $f$ coming over them. As above mentioned the sleeve $f$ and die J move together, and in this movement they are guided by the sleeve $m$ on the die frame J' and the vertical rod $n$ which receives said sleeve $m$ and prevents any lateral play in the die.

The passage $b$ in the block $a$ is elongated in form, as shown, and the purpose of this elongation is to permit the vertical adjustment of the block on the rod T in conformity to the position of the upper die section I without danger of the communication between said elongated passage $b$ and the interior passage V being cut off.

The dies I may vary in thickness for different classes of molding, and when a thicker die I is to be used it would probably be necessary to remove one or even more of the upper base blocks Q to compensate for the extra thickness of die, and at such time the lower base block Q with the die frame I' and block $a$ should be adjusted upward on the rod T, and during this adjustment the elongation of the passage $b$ preserves the communication with the passage V which is stationary.

The ports $d, j$, are each provided with a small screw valve or regulator $r'$ of well known form and whose purpose is to regulate the extent of the opening through said ports. The valves or regulators $r'$ are screw threaded and may be screwed into the ports $d, j$, or outward therefrom at will, thus more or less closing said ports and controlling the passage of the refrigerant through them.

The upper die frame I' bolted to or formed with the lower base-block Q is provided with the sleeve $m'$ encompassing the rod $n$ and having the set screw $m''$, the purpose being to facilitate the setting and adjustment of the upper die frame and the preservation of its alignment with the lower die frame.

As above mentioned the frame A has when in use an intermittent rotation, and although I do not limit the invention to any particular means for imparting this motion to the frame, there is illustrated in Fig. 2 convenient appliances for effecting this result through the instrumentality of the ratchet teeth $a'$ formed in the hub D co-operating with the spring acting pawl $b'$ pivoted to the lever $c'$, which is loosely mounted at its inner-end on a hub $d'$, and at its outer end is connected with the rod $e'$. The rod $e'$ is connected with and mechanically forms a part of the piston rod $f''$ carrying within the air cylinder $g'$ the piston head $h'$, which is kept normally at the right hand end of the cylinder $g'$ by the tension of the coiled spring $i'$ encircling the rod $f'$. At the right hand end of the air cylinder $g'$ is formed the inlet port $j'$, which is connected with the compressed air supply pipe $k'$ and provided with the pivoted valve $m'''$, by which communication between the port $j'$ and pipe $k'$ may be either established or cut off. In the present position of the valve $m'''$ shown, the pipe $k'$ and port $j'$ are in communication with each other preparatory to the action of the air driving the head $h'$ and rod $f'$ outward to the left. To the lever $c'$ there is also secured the rod $n'$ carrying the tripping arm $o'$, whose purpose is on being carried to the left with the lever $c'$ and rods $e'$, $f'$, to strike the toe of the valve $m'''$ and thereby turn said valve on its pivot and cut off communication between the port $j'$ and supply pipe $k'$, thus relieving the pressure on the right hand side of the piston $h'$ which has driven said piston to the left hand end of the cylinder $g'$, and permitting the spring $i'$ to return the piston, piston rod and lever $c'$ to their normal position, which is that illustrated in Fig. 2. When the valve $m'''$ is in the position shown in Fig. 2, the air will enter the cylinder $g'$ and move the piston, rods $e'$, $f'$, lever $c'$ and rod $n'$ to the left, and cause the pawl $b'$ to rotate the frame A a distance equal to the length of one of the ratchet teeth $a'$ or, in the present instance, one-eighth of a revolution; and thereupon the arm $o'$ will trip the valve $m'''$ and permit the spring $i'$ to return the parts to their normal position, as above stated, preparatory to another partial rotation of the frame A being effected by the re-setting of the valve $m'''$ to establish communication between the port $j'$ and pipe $k'$. The valve $m'''$ may be re-set or re-tripped to its open position by any of the well known valve tripping mechanisms now in use, and hence I have not deemed it necessary to illustrate such devices.

I have described above certain features of construction whereby the dies I, J, may be cooled by the action of compressed air entering the pipe Z, and it may be expedient here to say that prior to the entrance of the air to the pipe Z it will be passed through an ordinary refrigerant condenser, not shown, for the purpose of reducing its temperature, and that thereafter it will immediately enter the pipes Z, Y, and be expanded in the serpentine passages R. S. whence it will escape to the atmosphere.

The dies I, J, may be heated on the usual steam tables if preferred, within the scope of a portion of the invention, but such method of heating is not desirable for many reasons and in the drawings I have illustrated means for heating the dies by means of the electric current. In carrying this portion of my invention into effect I connect the die sections I, J, with suitable conductors $s'$, $t'$, $A'$, $B'$, of an electric circuit, employing by preference the quantity current controlled by a rheostat in order that the dies may not be unduly heated. The degree of heat may be accurately determined by means of a thermometer and the rheostat set accordingly. The conductor $A'$ is in electrical connection with the conductor $B'$, see Fig. 2, and is in the form of a flat curved spring of sufficient width to extend from the die section I to the die section J when said sections are separated from each other or said spring may be in separate pieces one for each section of die since it is when in this condition that said sections are to be heated. Each pair of die sections I, J, are provided with the conductors $s'$, $t'$, and these conductors as the sections are successively brought into contact with the spring $A'$ by the intermittent revolution of the frame A insure the passage of the current through and the heating of the dies. When however the revolving frame A carries the die sections I, J, away from the spring $A'$, the electric circuit is thereby broken and will not be again completed until another pair of die sections I, J, are brought into contact with the spring $A'$. The dies I, J, are thus in pairs independently brought under the influence of the electric current and heated preparatory to receiving the plastic material. The effect of passing the electric current through the dies is to instantly heat them to the proper degree for receiving and effectually molding the plastic material, and it will be noted that this desirable result is accomplished not only instantly but the heat is distributed equally and without removing the dies from their supporting frames. Much time, space, labor and expensive steam tables and appliances are thereby saved and the nuisances resulting from leaking joints avoided, and the product is improved in character and quality. Since the frame A revolves the upper terminus of the conductors $s'$, $t'$, may be electrically connected with a circular track $w'$, which is itself in electrical connection with a trolley roller $x'$ included in the electric circuit, see Fig. 1, the result being that although the frame A revolves the conductors will always remain in the circuit, which will be completed upon any one pair of the die sections coming into contact with the spring $A'$, and instantly broken as soon as said sections leave said spring.

The ultimate object in heating the dies is to preserve the proper softening of the plastic material, without removing the dies from the machine, but it is obvious that a like result, sometimes desirable, may be attained by removing the dies from the machine and placing them in a metal receiver $a''$, see Fig. 5, which is included in an electric circuit through the medium of suitable conductors $c''$, $d''$ and rests upon a table or support $b''$, $e''$. In the use of the receiver $a''$ the dies may be instantly and uniformly heated, as in the construction shown in the remaining figures.

When the stock is heated independently of the dies, I recommend the employment of a plate $f''$, see Fig. 2, resting upon a convenient table $C'$ and included in the electric circuit formed by the conductors $g''$, $h''$. The material will be placed on the electrically heated plate $f''$ and be thereby softened preparatory for its reception by the dies.

The plate $f''$ will be particularly advantageous where the material to be treated is dried or has been seasoned, but my invention embraces means and methods for converting or forming the material adjacent to and feeding it into the dies (by once heating only) for immediate molding, thereby in some instances at least entirely dispensing with the necessity for the electrically heated plate $f''$ or the conductors $s'$, $t'$, $A'$; and in carrying out this feature of the invention I make use particularly of a screw stuffer $A''$ having the inlet $B''$, discharge nozzle $C''$ and internal screw $D''$, and being heated either by steam or, preferably, an electric current, the circuits for the latter being preferably through the conductors lettered respectively $E''$, $F''$, and $G''$, $H''$.

When the continuous method above referred to of converting the material, feeding it into the machine and molding it is applied to celluloid and other pyroxyline compounds important results are accomplished, and in explaining them it will be necessary to briefly refer to the present process of manufacture and then to point out the advantages gained by the method forming a part of my invention. In the manufacture of celluloid the soluble fiber is produced by treating the paper with acids, and it is then further prepared for subsequent manipulations by being washed in a water bath and subjected to the action of a "whizzer" by which the major portion of the water is removed from it. The soluble fiber, camphor, pigments and color are then thoroughly mixed and ground together in a mill, whereupon the material is by hydraulic pressure pressed into thin cakes, which are then put into an evaporating press to dry the moisture (water) therefrom, leaving the cakes hard and brittle. The cakes are then disintegrated by "crushing rolls," and the material thus formed is then thoroughly mixed with solvents and left in an air tight box until the solvent has thoroughly permeated the mass, when it will be ready for the next step of the process which is its subjection to heated calender rolls to complete the thorough mixing of the ingredients and the formation of a uniform homogeneous mass. The material is then pressed into slabs and sheeted or given other form, and seasoned in driers for from ten days to six weeks at a temperature of about 120° Fahrenheit for the purpose of extracting as far as desirable the liquid solvents. The material is then in condition to be utilized for the various articles of commerce to which it is applicable, and may be molded into the desired outlines.

The molding of the celluloid may be performed in either of two ways. First, the stock may be placed in the mold and both then placed in a hydraulic press and heated. After the proper softening of the stock under the action of the heat, pressure is applied to close the mold, whereupon the mold and its contents will be cooled by water, and thereafter the pressure relieved and the molded article removed; or, second, the mold and stock may be placed on a steam table and there allowed to remain until the proper heat in the mold and softness of the stock have been attained, after which the stock is closed within the mold and the latter placed in a cooling press under hydraulic pressure. This pressure will be continued until the cooling has been effected, when it will be relieved and the molded article withdrawn.

In regard to the above process of manufacturing celluloid it is important to note, as bearing on the present invention that during the rolling of the stock on the heated calender rolls probably sixty per cent. of the alcohol (solvent) evaporates or is lost because of the great and ever changing surface of the stock; also that the stock after leaving the rolls must remain soft enough upon being pressed into the large cake or slab, to permit the sheeting of the latter by means of knives, and that it is the excessive quantity of solvent in the material which necessitates the long continued seasoning of the latter for its removal.

In accordance with my invention I very greatly simplify and expedite the process of manufacture and leave the material in condition for immediate molding, instead of in a condition requiring a seasoning of from ten days to six weeks in heated driers; and in carrying into practice this portion of my invention I take the dry granular material from a pair of "crushing rolls" and (discarding all of the subsequent steps and apparatus above referred to in the former method of manufacture) at once apply, say, twenty-five per cent. of the former amount of solvent (alcohol) used, and thereupon directly place the material with the solvent upon it, into the mouth of the heated screw stuffer $A''$, which will thoroughly knead and render homogeneous the mass and discharge the completed compound through the nozzle $C''$ in a condition appropriate for immediate molding in the dies.

In accordance with my method of manufacture directly in the heated screw stuffer the evaporation of solvents is reduced to a minimum, not being exposed to the atmosphere as on the calendar rolls of the former methods; and since the material (celluloid) after leaving the stuffer is subjected to no process other than molding it may contain only that amount of solvent, which, according to the former methods, would remain in the material after the ten days' or six weeks' seasoning in a heated drier. The material is thus from the dry granular form taken from the crushing rolls completed into the finished celluloid by a single operation, and leaves the stuffer with just the required amount of solvent necessary for its immediate molding in the dies, or to be run off into rods, tubes, or strips for commercial purposes. The celluloid leaving the stuffer being already in a heated condition it may be at once molded in the machine shown without further heating.

It will appear plain to those skilled in the art that according to my invention a vast amount of time, labor and machinery are saved in the manufacture of celluloid and its subsequent molding, and that probably seventy-five per cent. of the solvent (alcohol) used in the former methods is saved. The material itself is also improved in quality, since with the one heating the crude material is converted into the finished molded articles ready for the market.

In the operation of the machine for molding the material hereinbefore described, it is understood that the dies and material may be heated by the electric current either within or without the machine, or said material may be received directly from the screw stuffer and at once subjected to the dies I, J. The operation of the machine may be best understood however from an explanation involving the heating of the dies without removing them from the machine, and in this explanation, upon reference to Fig. 4, the pair of dies I, J, immediately at the right of those in contact with the spring A' may be considered as the point at which the material is fed to the dies, while the pair of dies immediately at the left of those in contact with the spring A' may be considered the point at which the molded articles are withdrawn from the dies. The dies while in contact with the spring A' are open or separated from each other and are heated by the action of the electric current, as above described. They are thereafter by a partial rotation of the frame A carried one space to the right, being then at the feeding point, and then during the momentary stoppage of the frame A the material is fed into said dies, which as the frame again starts to rotate close together under pressure on the material, the valve P at this point being turned to admit the water to the cylinder L and plunger K. This pair of closed dies remain under pressure until they reach the point at the left of the spring A', where the valve P will be turned to cut off the hydraulic pressure from the pipes M and permit the escape of the water from the cylinder L, under which condition the lower die sections will descend to their normal position by the force of springs $u'$ (see Fig. 1), and leave the molded articles in condition to be withdrawn, prior to said pair of dies being again carried against the electric spring contact A' and re-heated. After the dies have been supplied with the material at the feeding point and they close together by the ascent of the lower sections J, communication is established between the refrigerant pipes, passages V, W, and the serpentine passages R, S, and this communication will remain established during all the travel of the closed dies until they come to the discharge point at the left of the electric spring contact A', at which point the descent of the lower section J will cut off such communication. The heated dies closed upon the material at the feeding point are thus brought and kept under the action of the refrigerant during the rest of their line of travel to the discharge point, and hence, when the dies do open, the formed article or articles within them will have attained a rigid condition. Each pair of the dies when they reach the spring A' complete the electric circuit and are at once heated, and as they successively move onward to the feeding point the plastic material is given to them. They close by the ascent of the lower sections J and the communication with the refrigerant is established, whereupon they are carried onward until the discharge point is reached, where the valve P is turned to cut off the pressure and the formed articles are withdrawn. The process of heating, applying pressure for molding, and the cooling is thus carried on with a minimum number of dies or impressions, and amount of manual labor, and no necessity for the many steam tables, cooling and other appliances involved in the methods heretofore employed.

I have not shown in the drawings any means for turning the valves P on at the point of supply and off at the point of discharge, but these operations of the valves P may be accomplished by any convenient automatic appliances for this purpose now well known or the valves may be turned by hand or foot mechanism.

I have described above the use of the electric current for heating the dies I, J, either within or without the machine, or heating them with or without the plastic material either together or separately on an electric plate $f''$, or for converting and heating the materials at a single operation in the screw stuffer, and these features suggest further applications of the invention in the manufacture or treatment of plastic material. For example the heated calender rolls used in the methods now employed may be brought under the influence of the electric current and very uniformly and quickly heated, thus dispensing with much labor and expense, and other instances of such beneficial applications could be mentioned. I do not therefore limit the invention to the heating of the dies or stuffers by the electric current but include within the scope of this application any metal portion of the appliances used in the manufacture of plastic material when such portion is for contact with the material and included in an electric circuit for the purpose of being heated.

It is obvious that the dies arranged one above the other in a hydraulic press in accordance with the present methods of molding plastic material may be heated by the electric current and cooled by the circulating refrigerant by a mechanical application to said press of the devices for effecting the heating and cooling illustrated in the drawings.

What I claim as my invention, and desire to secure by Letters Patent, is—

1. The method hereinbefore described of manufacturing celluloid, which consists in taking the dried material consisting of the soluble fiber, camphor and pigment, and converting the same into celluloid by applying a solvent thereto, and kneading the material with its applied solvent under the influence of heat within a space from which the atmosphere is excluded, whereby the solvent is confined within the space under the influence of heat and in contact with the material to the exclusion of the atmosphere and the excessive evaporation and dissipation of the solvent from the material is checked and the production of the celluloid facilitated, substantially as set forth.

2. The revolving frame and the series of dies carried thereby, combined with means substantially as described for forming an electric circuit through said dies as they pass a given point; substantially as set forth.

3. The frame and the series of dies carried thereby, combined with the circulating passages for a refrigerant, and the electric circuit through said dies for heating them; substantially as set forth.

4. The frame having the lateral facing flanges and the die sections carried by the upper of said flanges, combined with the hydraulic pistons carried by the lower of said flanges, the die sections seated on said pistons and valves for independently controlling each piston; substantially as set forth.

5. The frame carrying the dies, one section thereof being movable, combined with refrigerant passages in or adjacent to said dies, the inlet controlling sleeve connected with said movable section, and passages from a source of supply of refrigerant to said dies; substantially as set forth.

6. The die sections, and the passages R. S. therefor, one of the said sections being movable, combined with the passages V. W leading respectively to said passages R. S. and the valve sleeve $f$ carried by said movable section; substantially as set forth.

7. The revoluble frame, the series of upper die sections carried thereby and the corresponding series of lower die sections carried thereby, said dies being independent of each other and the sections of one series being independently movable toward the other series of said sections, combined with the series of tubes leading from a source of fluid supply under pressure to said series of movable die sections and valves for regulating the action of said fluid in independently moving said die sections to mold the material, substantially as set forth.

8. The revoluble frame, the series of upper die sections carried thereby, and the corresponding series of lower die sections carried thereby, the sections of one series being independently movable toward the other series of said sections, combined with the circulating passages in or adjacent to said die sections, and the series of tubes leading from a source of refrigerant to said circulating passages; substantially as set forth.

9. The revoluble frame, the series of upper die sections carried thereby, and the corresponding series of lower die sections carried thereby, combined with means for successively moving the die sections of one of said series toward the corresponding sections of the other series and maintaining them in closed position during the revolving of said frame; substantially as set forth.

Signed at New York, in the county of New York and State of New York, this 9th day of October, A. D. 1891.

HORACE E. MILLER.

Witnesses:
CHAS. C. GILL,
ED. D. MILLER.